United States Patent

Nick

[15] 3,692,338
[45] Sept. 19, 1972

[54] CONNECTOR FOR TUBULAR ELEMENTS

[72] Inventor: Didier P. Nick, Nanterre, France

[73] Assignee: Societe des Verreries Industrielles Reunies du Loing, Perret, France

[22] Filed: Dec. 17, 1969

[21] Appl. No.: 885,768

[30] Foreign Application Priority Data

Dec. 18, 1968 France..................68178801

[52] U.S. Cl..................285/272, 285/363, 285/365, 285/369, 285/414, 285/DIG. 12
[51] Int. Cl..............................F16l 27/00
[58] Field of Search......285/369, 363, 364, 365, 367, 285/406, 407, 411, 414, 400, DIG. 12

[56] References Cited

UNITED STATES PATENTS

| | | | |
|---|---|---|---|
| 3,479,069 | 11/1969 | Sedam | 285/364 |
| 2,786,486 | 3/1957 | Perkins | 285/364 X |
| 514,822 | 2/1894 | Gennert | 285/365 X |
| 1,093,868 | 4/1914 | Leighty | 285/414 X |
| 3,152,816 | 10/1964 | Smith | 285/363 X |
| 3,156,035 | 11/1964 | Diehl et al. | 285/363 X |
| 3,231,298 | 1/1966 | Tomb et al. | 285/365 X |
| 3,404,902 | 10/1968 | Latham et al. | 285/364 X |
| 3,451,697 | 6/1969 | Bula | 285/364 X |

FOREIGN PATENTS OR APPLICATIONS 674,416  11/1963  Canada.....................285/365

Primary Examiner—Dennis L. Taylor
Attorney—Sughrue, Rothwell, Mion, Zinn & Macpeak

[57] ABSTRACT

A device for connecting tubular elements, especially fragile elements such as glass tubes, utilizing two interconnected half collars that permit relative rotation. An elastic and chemically inert joint comprising an elastomer core and an envelope of polytetrafluoroethylene is positioned between the tubular elements. The half collars may be interconnected by a male-female arrangement on bosses and a ferrule.

4 Claims, 4 Drawing Figures

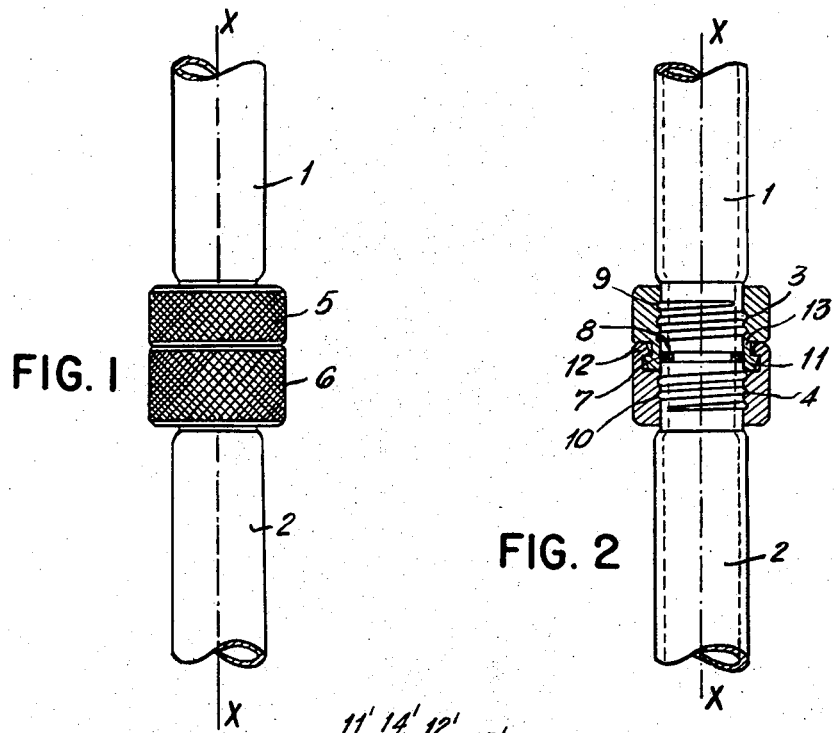
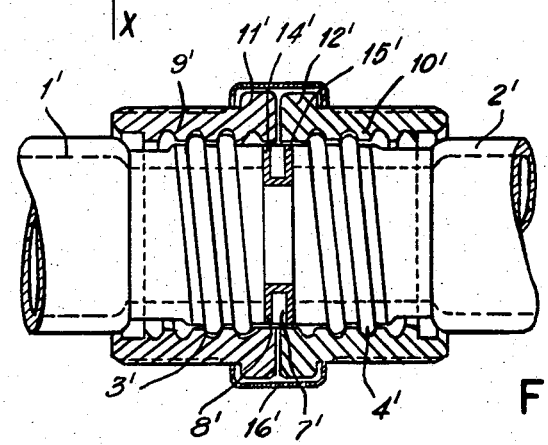
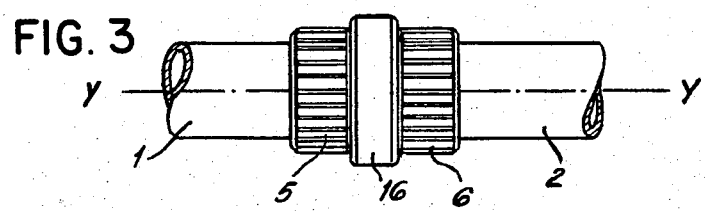

CONNECTOR FOR TUBULAR ELEMENTS

This invention relates to a device for connecting of tubular elements such as pipes whose ends are threaded and more particularly pipes that carry corrosive material. This device provides a rigid, sealed assembly, without using lubricant. The component pieces of this invention are both interchangeable and chemically inert with respect to the liquids or vapors that may circulate in the pipes.

While there are several ways of joining tubular elements, the joints used in connecting glass tubes can generally be classified in two groups, depending upon whether a certain clearance is or is not possible between the elements.

In the group of flexible junctions there exists spherical rotation with grease, and spherical rotation with a toric ring made of elastic matter, as described in French Pat. No. 1,236,037, taken out in the name of the present applicant.

In the group of rigid junctions, the following connections are known: the ground conical joint, with or without grease, where the male piece may furthermore be sheathed by a sheet of P.T.F.E. (polytetrafluoroethylene); the non-ground conical joint, with polished contact surfaces; the conical joint with toric ring made of elastic substance and assembled by means of a collar with a flat ring or toric joint placed between the sides of the two pieces; and finally the assembly of tubes, where at least one is threaded and an intermediate piece permits the connection of tubes with different diameters, as described in French Pats., No. 1,262,675 and No. 81,488, in the name of the applicant.

According to this invention, connection between two contacting pipes having the same cross-section and being threaded on their outside, is accomplished by means of an elastic and chemically inert joint placed between the pipe ends. Two half-flanges, each provided with inside threading at the same pitch as that of the pipes are made in one piece with each other along their common axis. The half-flanges assure, by means of screwing the tubes in the half-collars, tight contact of each of the pipe ends on the corresponding face of the joint.

This tight contact will be maintained when used in an environment having either a relatively strong vacuum ($10^{-4}$ mm Hg) or elevated pressures that may range as high as 2 bar. It can easily withstand operating temperatures between about $-60°$ C and $+200°$ C.

The assembly of the two half-collars is so designed as to permit the rotation of one of the pieces with respect to the other around their common axis, whereas any movement along this axis is prevented. This assembly may be accomplished either by housing one end of a one-half collar in the other, with the latter being retained by tenons provided on each piece or by means of a ferrule which surrounds outside bosses provided on each piece.

The above features, as well as other secondary characteristics, and the advantages deriving from them will emerge more completely in the specifications below, presenting particular forms of implementation, given here by way of indication and without any limitations, reference being made to the attached drawings, where:

FIG. 1 represents an elevation view of this invention;

FIG. 2 is a cross-section view taken along a plane running through the axis of the invention shown in FIG. 1;

FIG. 3 is an elevation view of a modified embodiment of this invention;

FIG. 4 is a cross-section view taken along a plane passing through the axis of the modified invention shown in FIG. 3.

Referring now to FIGS. 1 and 2, which disclose a tube assembly according to the invention, the tubes 1 and 2 with threaded ends, respectively marked 3 and 4, are held rigidly according to the same axis XX by means of two half-collars 5 and 6 whose outside surfaces bear the imprint of hooking grooves. An elastomer core 7, covered with an envelope of polytetrafluoroethylene 8, constitutes a chemically inert and elastic joint which is arranged between the respective edges of the ends of glass pipes 1 and 2. This joint, which has the shape of a crown, possesses a certain elasticity in the direction of the XX axis. The two half-collars 5 and 6 have inside threading 9 and 10 with the same pitch as the threading of the tubes to be connected. These half-collars are made in one piece with each other with the help of retaining bosses 11 and 12, respectively, formed at the opposite ends of the male piece 5 and the female piece 6. Half-collar 5 furthermore has a portion 13 in its inside wall which does not have any threading; this provides for tight contact of the assembly 5–6 with the ends of the tubes and the joint 7–8. The retaining bosses 11 and 12 assure the connection of the two half-collars along axis XX, while permitting a rotation of these collars around the same axis. It is this freedom of rotation around axis XX which enables to tighten the pieces against each other and their orientation along predetermined directions. In making the assembly, it suffices to screw the neck of one of the tubes into one of the half-collars (by rotation one of the two pieces), to put the joint 7–8 in place, to introduce the neck of the other tube into the second half-collar and to tighten by screwing (turning one or the other one of the pieces). It is possible to fix the orientation of the second tube and terminate the screwing by means of the second collar. This collar for example, enables us, if one of the tubes has an angle which we want to turn in a certain direction of the plane, to accomplish this the moment the pieces are assembled with each other, without having to worry about undoing the tightness as a result of a subsequent rotation of the pieces with respect to each other.

Referring now to FIGS. 3 and 4, which show a modified embodiment of the invention, tubes 1' and 2' with threaded ends, respectively marked 5' and 6', are held rigidly according to the same axis YY by means of two half-collars 5' and 6' whose outside faces have grooves to facilitate manipulation. An elastomer core 7', covered with an envelope 8' of polytetrafluoroethylene, for example, constitutes a chemically inert and elastic joint, between the respective edges of the ends of glass pieces 1' and 2'.

The two half-collars 5' and 6' can be made of any heathardening material, such as bakelite or melamine, for example, or they can be made of any thermoplastic material, such as charged nylon, for example, or they can be made of an agglomerated fibrous material. On the major portion of their length, they have inside threading 9' and 10', with the same pitch as the threading of the tubes to be connected. These half-collars are in contact with each other by means of bosses 12' and 13', having the shape of crowns projecting with respect to the diameter of the body of the two pieces which are engaged in a ferrule or retaining collar 16'. This ferrule may be made from a strip of stamped metal, closed upon itself to form a ring or it may be made of plastic with injection molding. It may come in one or several pieces articulated with each other. The ferrule connects the two pieces along the YY axis, while permitting their rotation around the same axis. Each of the half-collars have on the level of bosses 12' and 13' a wall without threading, respectively 14' and 15', which permits tight contact of the assembly 5'–6' with the ends of the tubes 1'–2' and the joint 7'–8'. The assembly and the tightening of the various pieces constituting the device can be accomplished in any fashion similar to that described for the preceding version.

It should be noted furthermore that if it is desirable to place the joint in a predetermined plane, it would be possible in the first version to provide on the level of portion 13 of the inside wall of male piece 5 a circular shallow groove with a height equal to the thickness of joint 7–8. The depth of the groove thus made would have to be large enough to allow penetration into the inside of the half-collar 5, a certain crown width of joint 7–8 that would at least be equal to the thickness of the wall of the glass tubes.

The same arrangement could be added in the second version by providing, on the level of the unthreaded zones 14' and 15' (FIG. 4) of the half-collars 5 and 6, grooves, each one of which would have a height (dimension along the axis of the device) equal to ½ of the thickness of joint 7'–8'.

It is obvious that these structural features are optional and that, although this description was partly made in reference to both particular forms here, we can introduce numerous detail variants without going beyond the framework of the invention.

What is claimed is:

1. A connector for sealingly fastening two rigid glass tubular elements together while permitting relative rotation, each of the tubular elements having a threaded exterior surface adjacent their respective abutting ends, comprising a pair of half collars, each half collar having internal threads complimentary to the respective threaded surface of a tubular element and a boss positioned adjacent the threaded surface, each boss extending radially outward to form a shoulder on its half collar and inward to form with the other boss non-threaded positioning land area;

an elastic crown sealing member positioned by the land area between the two rigid tubular elements having an inner elastomer core and an outer coating of a chemically inert plastic on only the three radially inward surfaces of the elastomer core, whereby the crown sealing member is flexible along the longitudinal axis of the tubular elements; and a ferrule surrounding both shoulders of the respective bosses when they are in an abutting relationship to permit relative rotation of each half collar and respective tubular element while preventing longitudinal movement.

2. A connecting device for sealingly fastening together two glass tubular elements in an abutting relationship, each of said tubular elements having outwardly threaded surfaces adjacent their respective ends, comprising:

a pair of half-collars, each of said half-collars having internal threading complementary to the threaded surfaces of each respective tubular element and a non-threaded internal surface adjacent the abutting ends of said tubular elements;

a resilient and chemically inert joint located between the respective ends of said tubular elements, only in the non-threaded area of each half-collar and forming an impervious joint; and means for connecting said two half-collars together, while permitting a free relative rotation of said half-collars when said tubular elements are not yet tightly screwed in said respective half-collars.

3. A connecting device as in claim 2, wherein the connecting means includes a crown boss on each half-collar respectively extending radially outward to form a shoulder and a ferrule for interlocking said crown bosses while permitting the free relative rotation of said two half-collars.

4. A connecting device as in claim 2, wherein the resilient joint includes an inner elastomer core and an outer envelope of an elastic and chemically inert material.

* * * * *